United States Patent
Onitsuka et al.

(10) Patent No.: US 10,989,858 B1
(45) Date of Patent: Apr. 27, 2021

(54) ILLUMINATION DEVICE

(71) Applicant: OMRON Corporation, Kyoto (JP)

(72) Inventors: Hiroyuki Onitsuka, Kani (JP); Junya Fujita, Ichinomiya (JP); Takehiro Agata, Ichinomiya (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/953,397

(22) Filed: Nov. 20, 2020

(30) Foreign Application Priority Data

Dec. 26, 2019 (JP) .............................. JP2019-237123

(51) Int. Cl.
*F21V 8/00* (2006.01)
(52) U.S. Cl.
CPC ......... *G02B 6/0021* (2013.01); *G02B 6/0068* (2013.01); *G02B 6/0073* (2013.01); *G02B 6/0078* (2013.01); *G02B 6/0083* (2013.01)
(58) Field of Classification Search
CPC .. G02B 6/0021; G02B 6/0011; G02B 6/0068; G02B 6/0073; G02B 6/0078; G02B 6/0083
See application file for complete search history.

(56) References Cited

U.S. PATENT DOCUMENTS

2011/0080539 A1* 4/2011 Shimizu ............... G02B 6/0028
349/62
2018/0164492 A1* 6/2018 Takagi ................. G02B 6/0018

FOREIGN PATENT DOCUMENTS

JP       2006075362 A  *  3/2006
JP          3120480 U       4/2006

* cited by examiner

*Primary Examiner* — Mary Ellen Bowman
(74) *Attorney, Agent, or Firm* — METROLEX IP LAW GROUP PLLC

(57) ABSTRACT

An illumination device according to one or more embodiments may include flat light guide plate units each including: a light guide plate, a light source unit, a cover covering a light emission surface of the light guide plate, and a case positioned on a back surface side of the light guide plate; and a base to which the light guide plate units are attached. The attachment surface may be divided into sections for attaching the light guide plate units such that the light guide plate units are laid over the attachment surface. Each of the sections may be provided with a circuit board for driving the light source unit, and a fixing portion for detachably fixing the light guide plate unit to the base. Each of the light guide plate units includes a visible sheet positioned between the light guide plate and the case.

12 Claims, 19 Drawing Sheets

WHEN LIGHT IS TURNED ON

WHEN LIGHT IS TURNED OFF

WHEN LIGHT IS TURNED ON

WHEN LIGHT IS TURNED OFF

FIG. 2
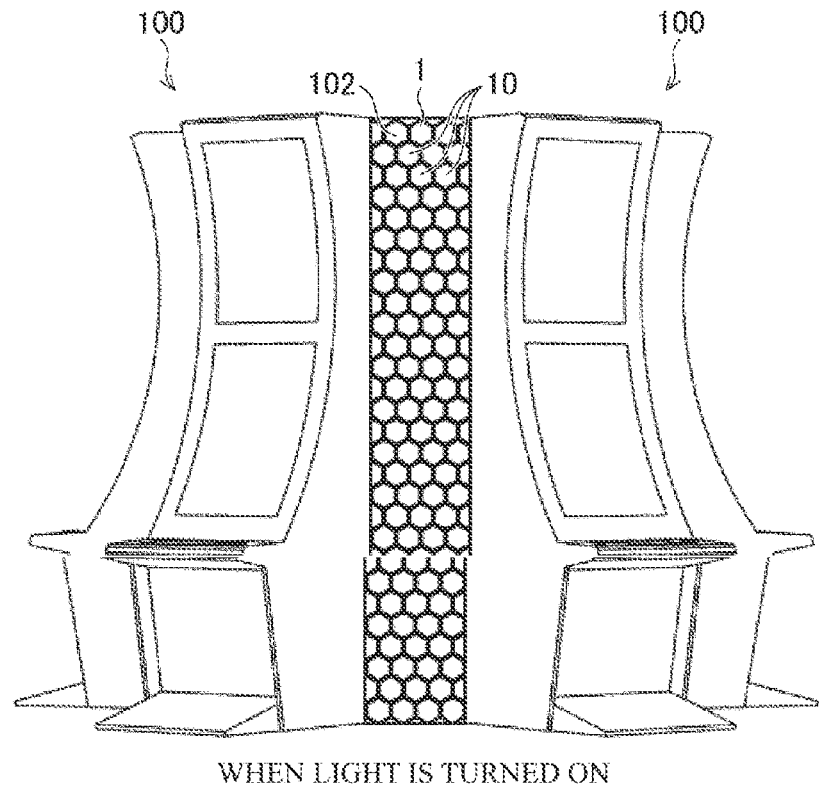
WHEN LIGHT IS TURNED ON
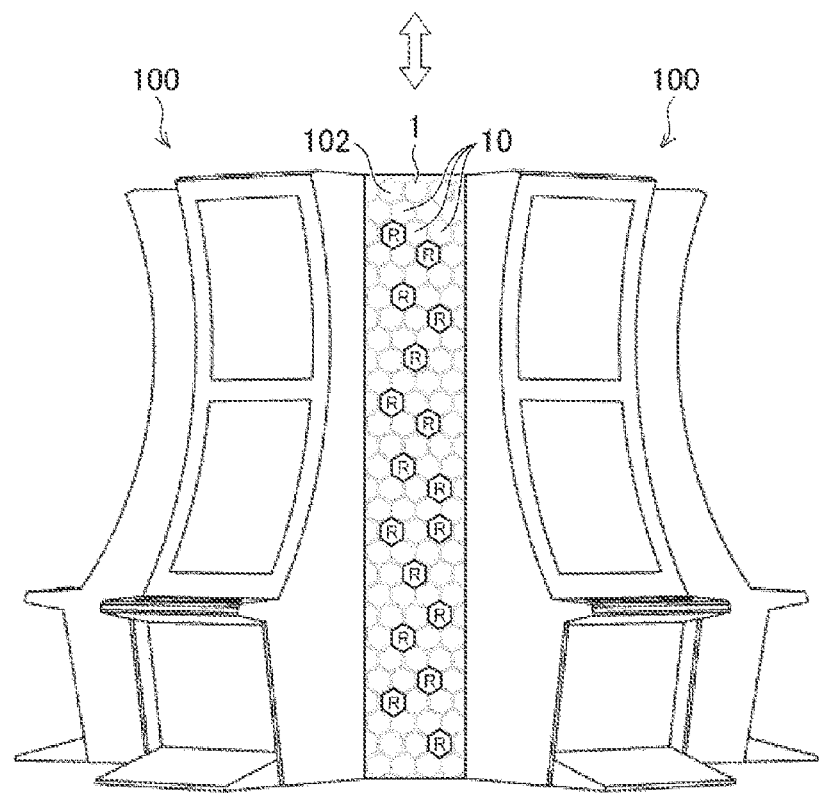
WHEN LIGHT IS TURNED OFF

FIG. 19
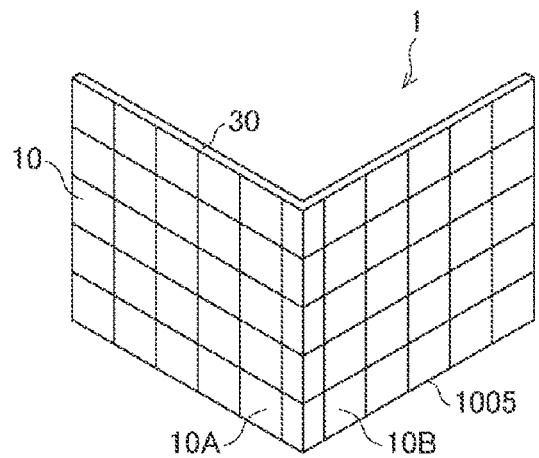
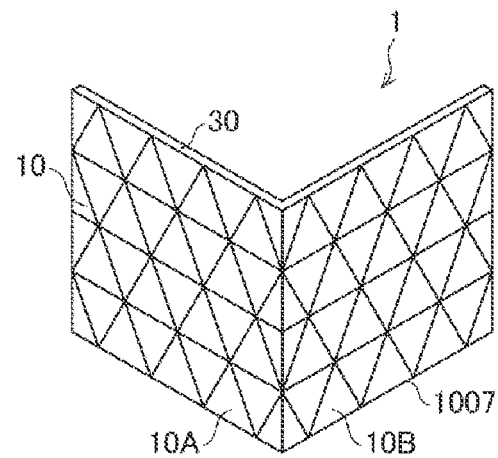
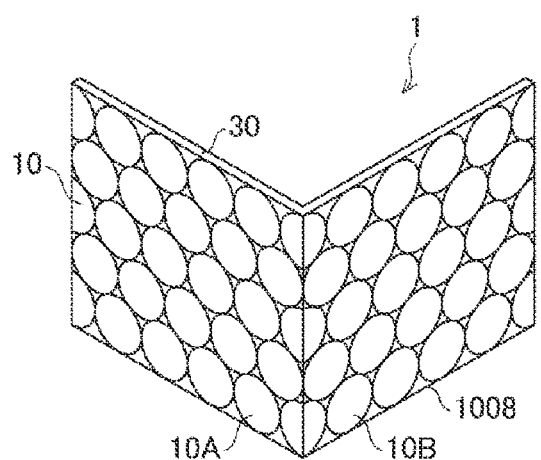
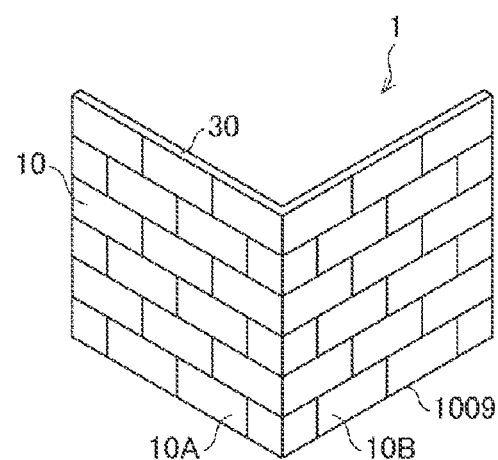
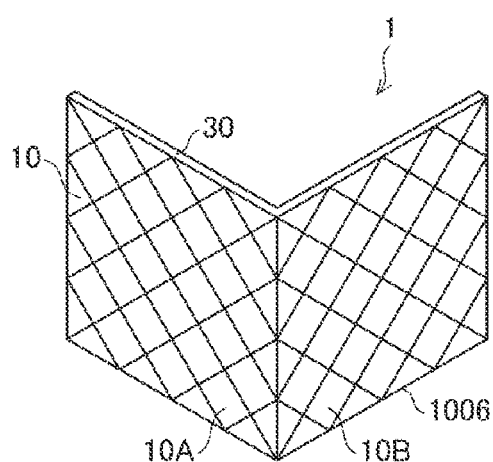

ILLUMINATION DEVICE

CROSS-REFERENCES TO RELATED APPLICATIONS

The present application claims priority to Japanese Patent Application No. 2019-237123 filed with the Japan Patent Office on Dec. 26, 2019, the entire contents of which are incorporated herein by reference.

BACKGROUND

The disclosure relates to an illumination device including a light guide plate.

Japanese patent application publication JP 3120480U discloses a configuration in which slot machine type game devices are positioned in a ring shape and spaces between the game devices are filled with spacers formed in a substantially triangular prism shape.

In addition, conventionally, a technique is known in which light emitted from a light source is caused to enter from an end surface of a light guide plate, is propagated inside the light guide plate, is reflected by prisms provided on a back surface of the light guide plate, and is emitted from a front surface of the light guide plate. JP 3120480U is an example of background art.

SUMMARY

The spacer disclosed in JP 3120480U corresponds to an example of a partition wall. However, JP 3120480U does not disclose anything other than the shape of the spacer, and does not provide a device serving as a partition wall used in a bright and brilliant space such as a game hall or an exhibition hall. Accordingly, when the device is installed in a game hall, which is a bright and brilliant space, the device lacks appeal and cannot be said to give a sufficient impact to players.

In addition, today, in parks, home gardens, and the like, vibrant illumination achieved through light-up is often performed, and development of an illumination device capable of performing more impactful presentation and that may easily be subjected to design change is expected.

Further, in such an illumination device, when a portion that is not illuminated due to a failure or the like occurs, the appearance deteriorates, and thus, development of a product having excellent maintainability is desired.

One or more embodiments made in view of the above issues, and an object of one or more embodiments may be to provide an illumination device that may constitute a partition wall or the like having an impact in a bright and brilliant space, and is excellent in maintainability.

In order to solve the above issues, according to one or more embodiments, there is provided an illumination device including: a plurality of flat light guide plate units each including a light guide plate, a light source unit, a cover covering a light emission surface of the light guide plate, and a case positioned on a back surface side of the light guide plate; and a base to which the plurality of light guide plate units are attached so as to be laid over an attachment surface of the base, e.g. over an entire surface or a part of the surface. The attachment surface may be divided into sections for attaching the plurality of light guide plate units such that the light guide plate units are laid over the attachment surface, each section is provided with a circuit board for driving the light source unit and a fixing portion for detachably fixing the light guide plate unit to the base, and each of the light guide plate units further includes a visible sheet positioned between the light guide plate and the case.

In the above configuration, it may be possible to produce illumination using the plurality of light guide plate units attached so as to be laid over the attachment surface. Because the base is provided with the circuit board corresponding to each of the light guide plate units, each of the light guide plate units may exhibit an independent presentation.

Because each light guide plate is attachable/detachable to/from the base, it may be easily disassembled and assembled, which facilitates the movement and installation of the illumination device. In addition, even when a defect occurs in the light guide plate unit, it is possible to replace only the light guide plate unit having the defect, and therefore maintainability is excellent.

Further, a presentation may be given by a combination of an illumination using a plurality of light guide plate units and visible sheets.

A light emitting device according to one or more embodiments may also further have a configuration in which unevenness is formed on the entire back surface of each light guide plate so that the light guided therein is emitted from the front surface.

According to the above configuration, when the light source unit is turned on, the entire surface of the light guide plate from which light is emitted is in an illuminated state, and therefore a difference from when the light source unit is turned off becomes clear, and it is possible to give more impact.

In the light emitting device according to one or more embodiments, each of the light source units may be a light source substrate including a substrate and a plurality of light source elements mounted on an end portion of the substrate, and a substrate portion of the light source substrate may be positioned between the sheet and the case. According to the above configuration, the substrate portion of the light guide plate may be hidden by the sheet.

In the light emitting device according to one or more embodiments, each of the light guide plate units and each of the light guide plates in the plurality of light guide plate units may also have an outer shape of a regular polygon having an internal angle by which 360 degrees are divisible. According to the above configuration, the gaps between the light guide plate units may be made as narrow as possible and be laid with a uniform width. In addition, because the light guide plates of the respective light guide plate units also have the same shape, the respective illumination surfaces appear to be laid without gaps, and the appearance becomes better.

In the light emitting device according to one or more embodiments, the attachment surface may also include a corner portion having a predetermined angle, the light emitting device may also further include a bent-shaped light guide plate unit to be attached to the corner portion, and the bent-shaped light guide plate unit may also have a shape obtained by bending the flat light guide plate unit at the same angle as the corner portion. According to the above configuration, the illumination device may be formed three dimensionally, and therefore the shape may be diversified.

In the light emitting device according to one or more embodiments, the bent-shaped light guide plate unit may also further be formed by butting together end portions of division lines of halved light guide plates obtained by dividing the light guide plate of a flat light guide plate unit into two, and forming an inclined surface with a reflection function at one end portion, the inclined surface with a reflection function being for changing an angle of guided light to cause the light to enter the other end portion. According to the above configuration, one light source unit may be shared by two halved light guide plates, and therefore cost may be reduced.

According to one or more embodiments, an illumination device that may constitute a partition wall or the like having an impact in a bright and brilliant space, and that is excellent in maintainability may be realized.

BRIEF DESCRIPTION OF THE DRAWINGS

FIG. 2 is a diagram illustrating a perspective view of a gaming machine group in which a blind plate for closing spaces between gaming machines is formed in an illumination device according to one or more embodiments.

FIG. 19 is a diagram illustrating modified examples according to one or more embodiments.

DETAILED DESCRIPTION

Hereinafter, one or more embodiments are described with reference to the drawings.

1. Application Example

Figure 1:
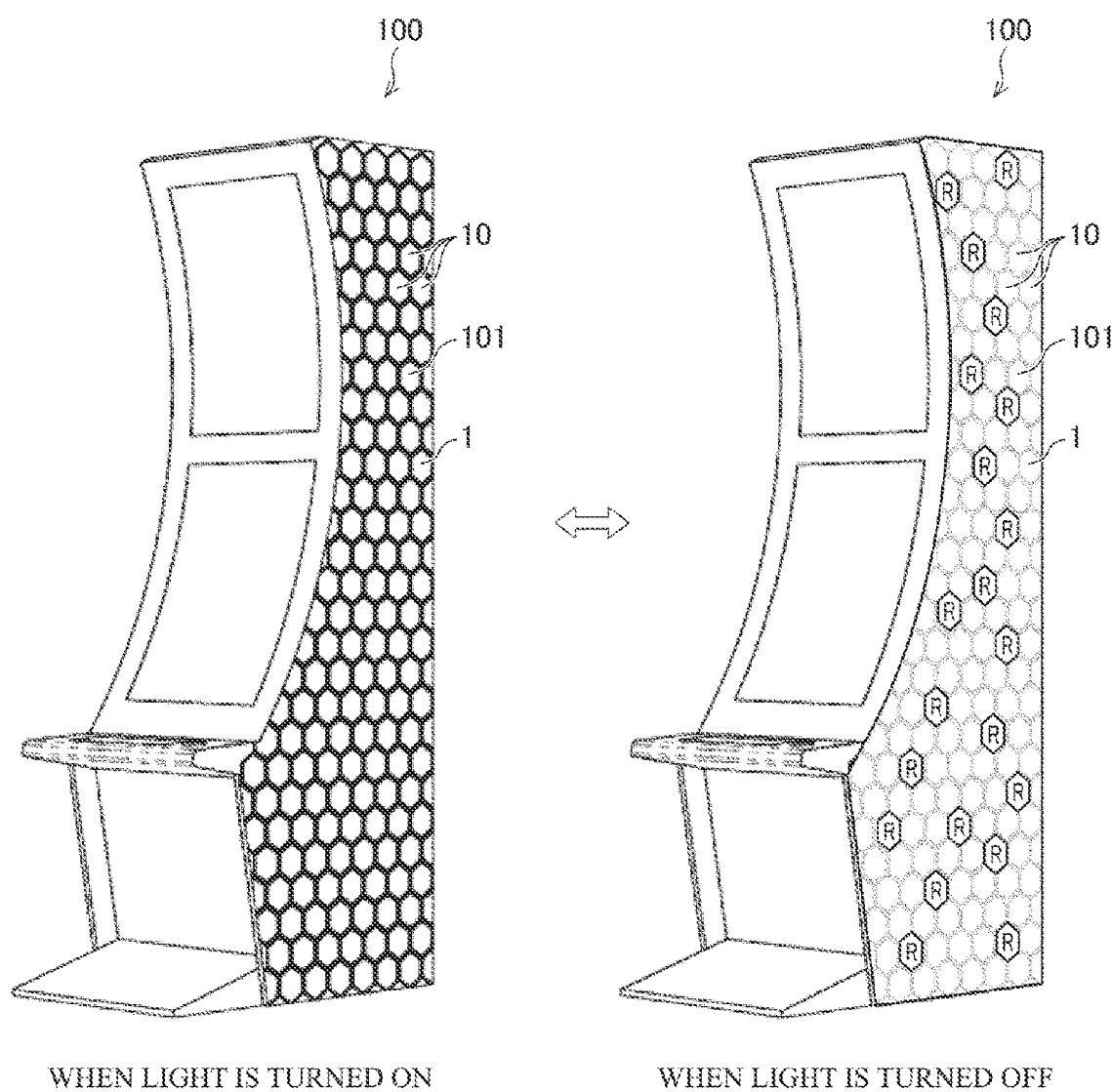
FIG. 1 is a diagram illustrating a perspective view of a gaming machine in which a side housing is constituted by an illumination device according to one or more embodiments.

First, an example of a scene to which one or more embodiments are applied will be described with reference to FIGS. 1 to 6, 8, 11, 13, and 18. FIG. 1 is a diagram illustrating a perspective view of a gaming machine 100 in which a side housing 101 is constituted by an illumination device 1 according to one or more embodiments. FIG. 2 is a diagram illustrating a perspective view of a gaming machine group in which a blind plate 102 for closing spaces between gaming machines 100 is formed in the illumination device 1 according to one or more embodiments.

Figure 3:
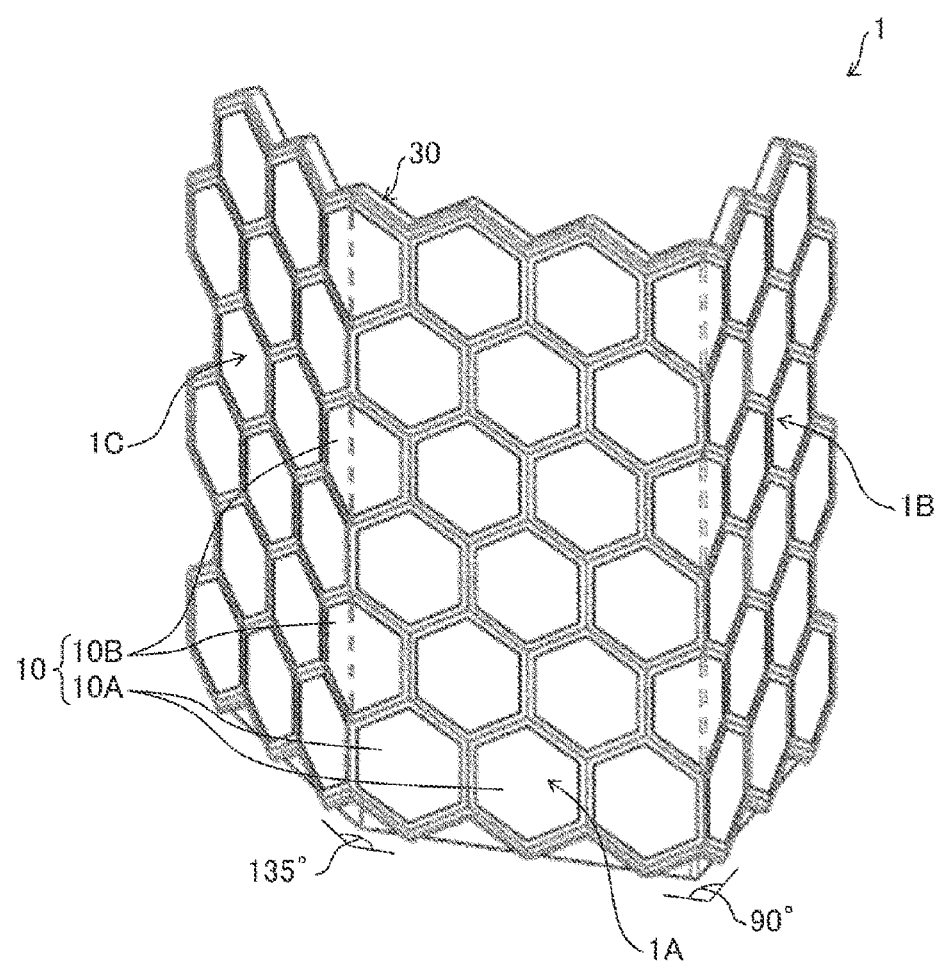
FIG. 3 is a diagram illustrating a perspective view showing an appearance of an illumination device according to one or more embodiments.
Figure 4:
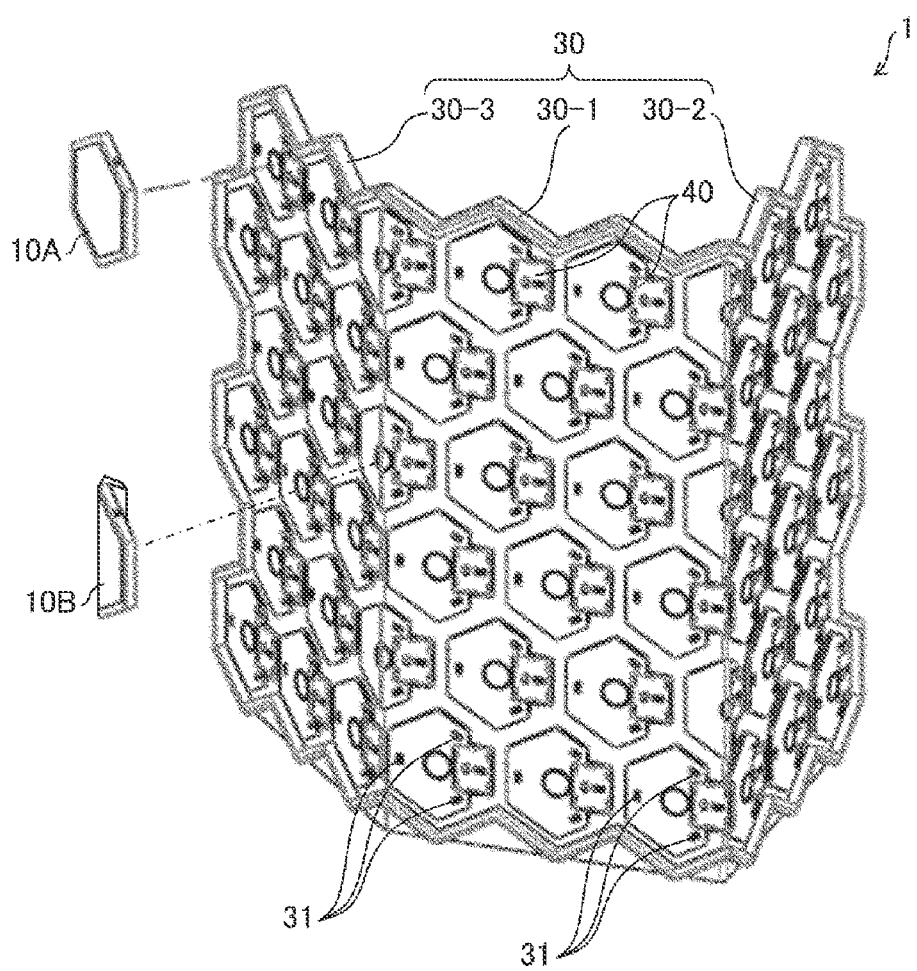
FIG. 4 diagram illustrating a perspective view showing a base and light guide plate units in an illumination device, such as in FIG. 3 in a separated state.

As shown in FIGS. 3 and 4, the illumination device 1 includes a base 30 that determines the shape of the illumination device 1 and a plurality of light guide plate units 10 attached to the base 30. The light guide plate units 10 include flat planar units 10A and bent-shaped corner units 10B. The planar units 10A are attached to flat portions of an attachment surface of the base 30, and the corner units 10B are attached to corner portions of the attachment surface. Each corner unit 10B is formed by bending the planar unit 10A at the same angle as that of the corner portion. The illumination device 1 constituting the side housing 101 shown in FIG. 1 and the blind plate 102 shown in FIG. 2 are constituted only by the planar units 10A.

The plurality of light guide plate units 10 are attached so as to be laid over the attachment surface of the base 30, e.g. over an entire surface or a part of the surface. In order to attach the light guide plate units 10 in the above described manner, the outer shape of each light guide plate unit 10 is preferably a regular polygon having an internal angle by which 360 degrees are divisible, and in one or more embodiments, each light guide plate unit 10 has a regular hexagon shape. However, although such a regular polygon may be preferable to lay the light guide plate units 10 with small gaps, a circle or the like may be employed.

Figure 5:
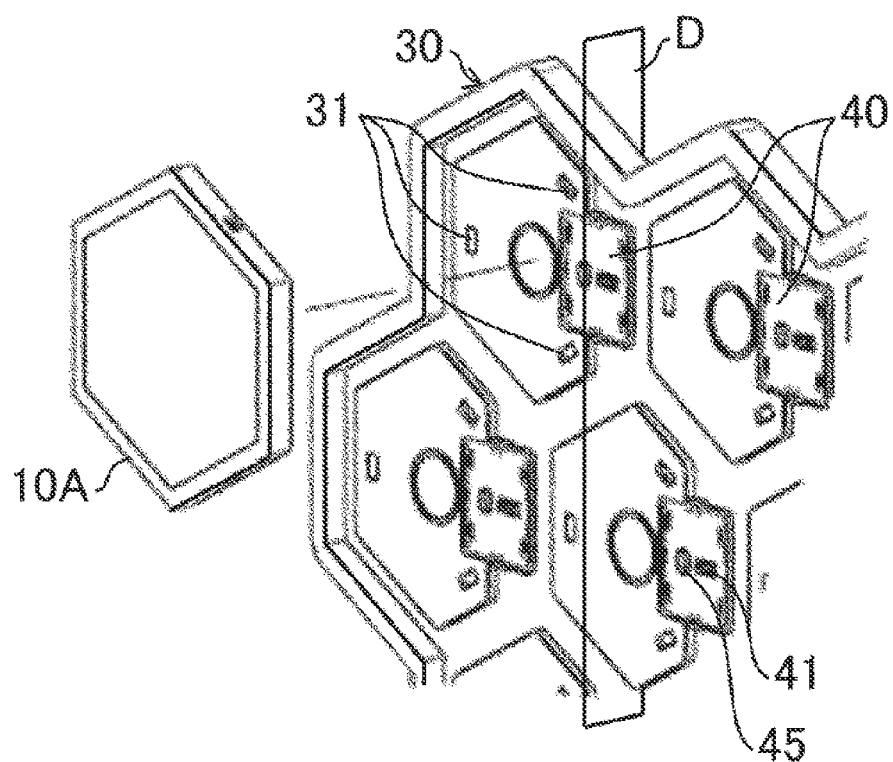
FIG. 5 is a diagram illustrating an exploded view of the main part of an illumination device, such as in FIG. 3, as viewed from a front side of a base.

As shown in FIG. 5, the attachment surface of the base 30 is divided into sections according to the shape of each light guide plate unit 10, and a connector unit 40 is installed in each section. Each connector unit 40 accommodates an IC board 43 (see FIG. 8) therein, and an IC-side connector 41 is provided on the attachment surface thereof. In addition, each section is provided with snap-fit engagement portions 31 for attaching the light guide plate unit 10.

Figure 6:
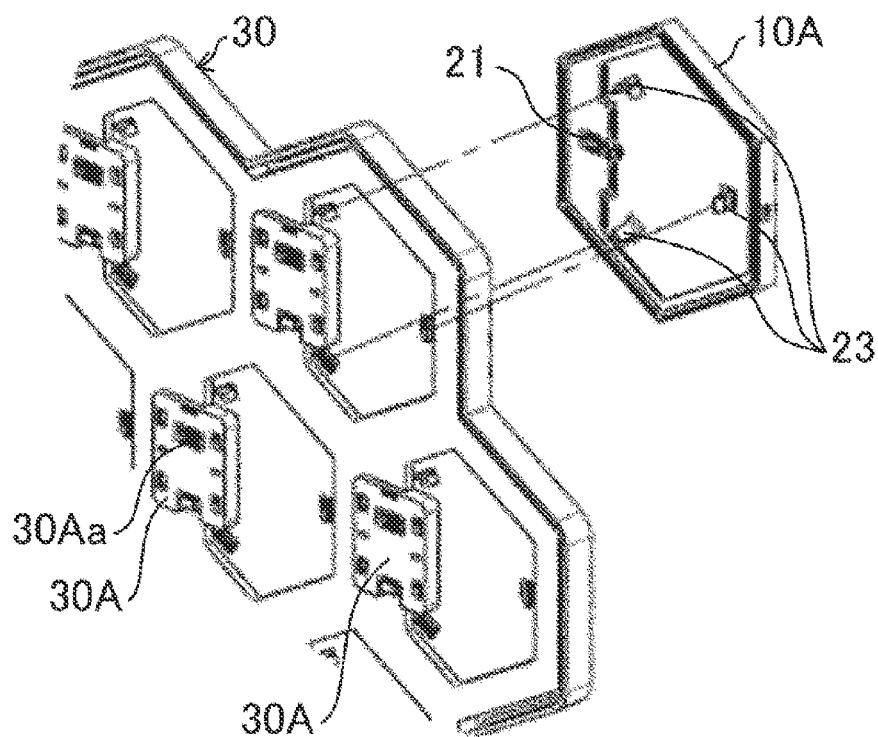
FIG. 6 is an exploded view of a main part of an illumination device, such as in FIG. 3, as viewed from a back side of a base.
Figure 11:
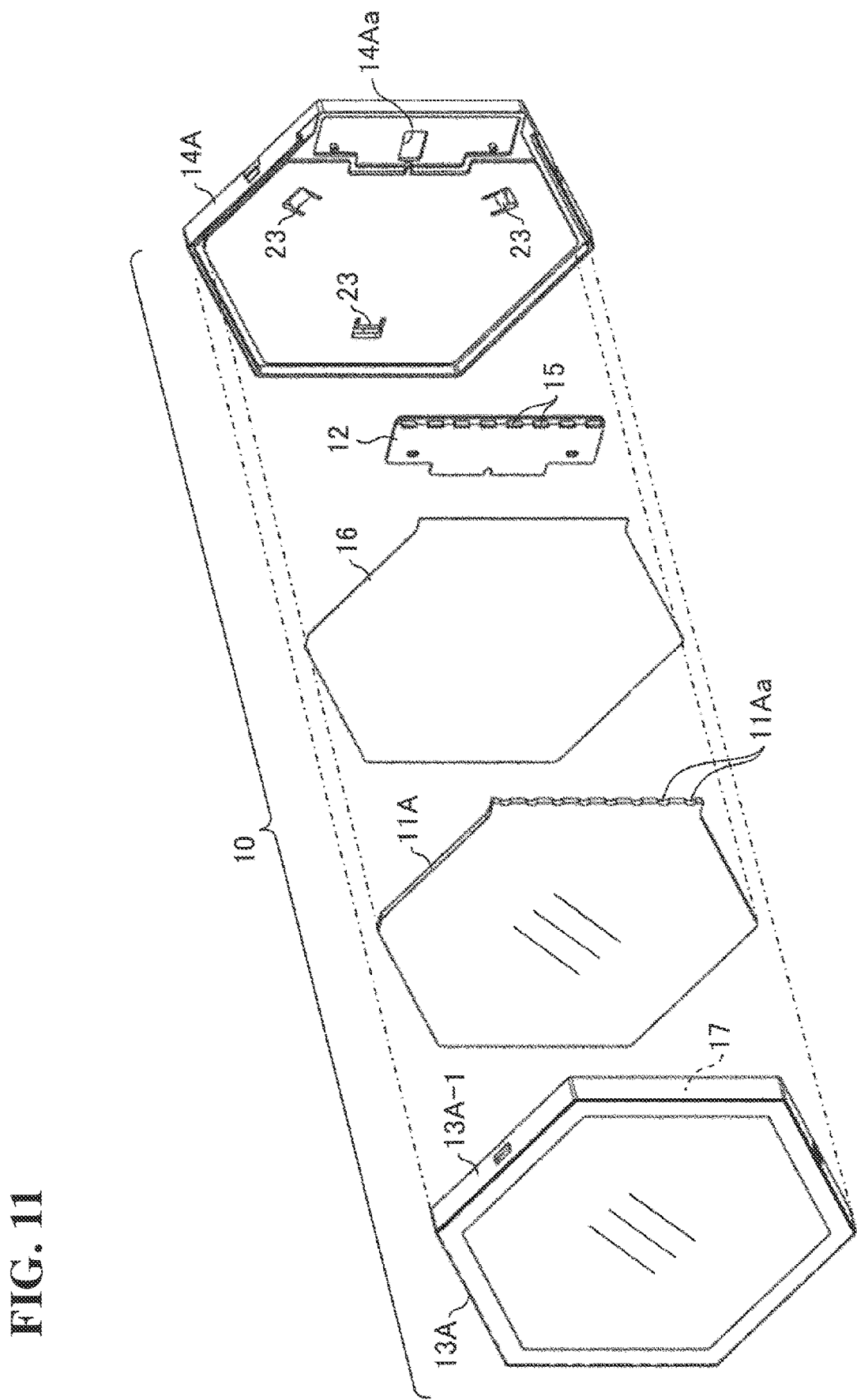
FIG. 11 is a diagram illustrating an exploded view of a planar unit in an illumination device, such as in FIG. 3.
Figure 13:
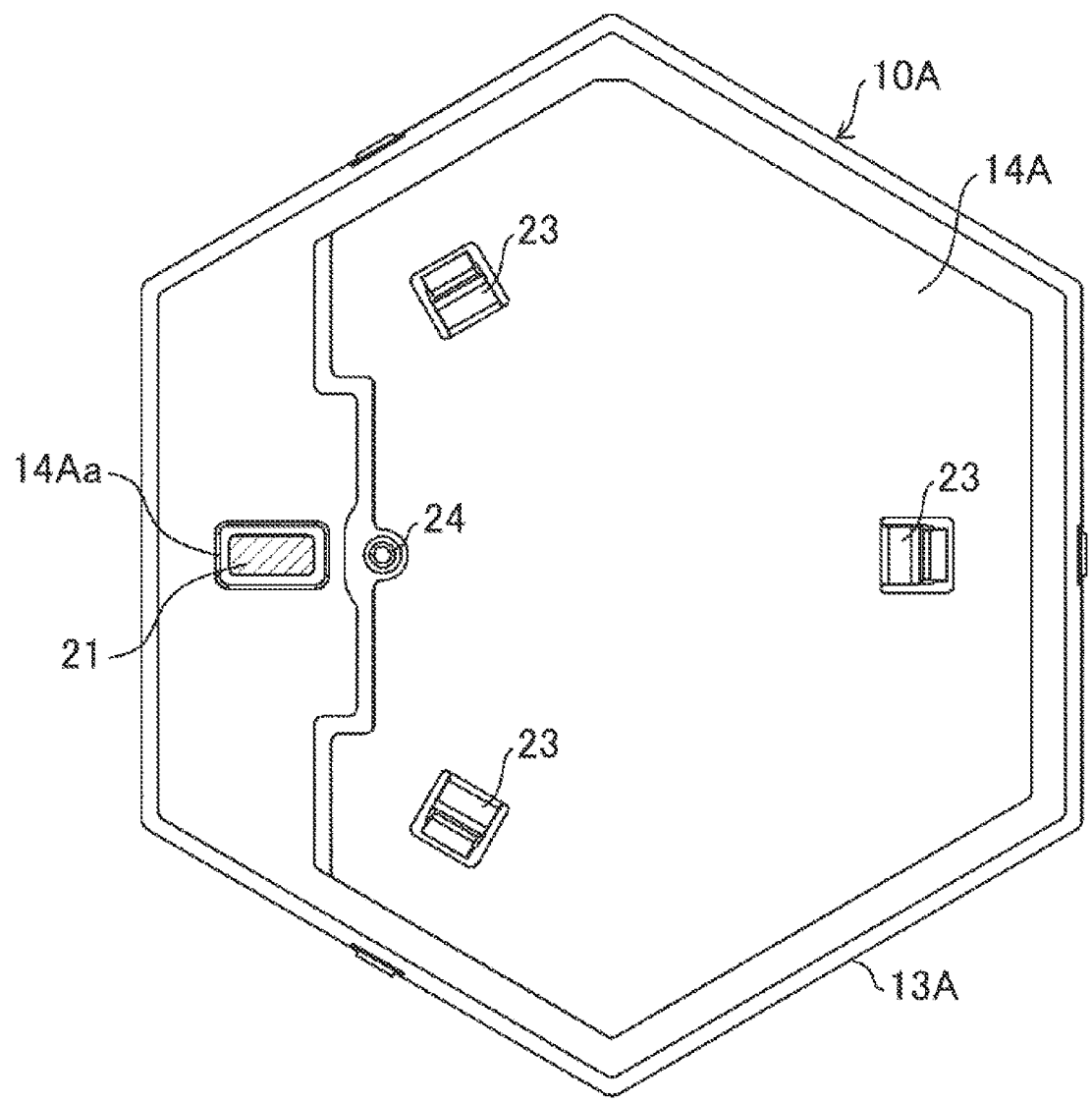
FIG. 13 is a diagram illustrating a rear view of a planar unit, such as in FIG. 11.

As shown in FIG. 11, each light guide plate unit 10 includes a light guide plate 11A, a sheet 16, a cover 13A, and a case 14A, each of which is formed in a regular hexagonal shape, and an LED substrate 12 on which a plurality of LEDs 15 are mounted is positioned at one end of the light guide plate 11A. As shown in FIGS. 6 and 13, snap-fit portions 23 to be engaged with the snap-fit engagement portions 31 of the base 30 and an LED-side connector 21 to be connected to the IC-side connector 41 of the base 30 are provided on the back surface of the light guide plate unit 10.

The sheet 16 is visible, includes a pattern or a design printed thereon, and is positioned on the back surface side of the light guide plate 11A. The sheet 16 is not limited to including a pattern or a design printed thereon, and may be black or white. Such a sheet 16 becomes visible when the light guide plate 11A is turned off.

Figure 18:
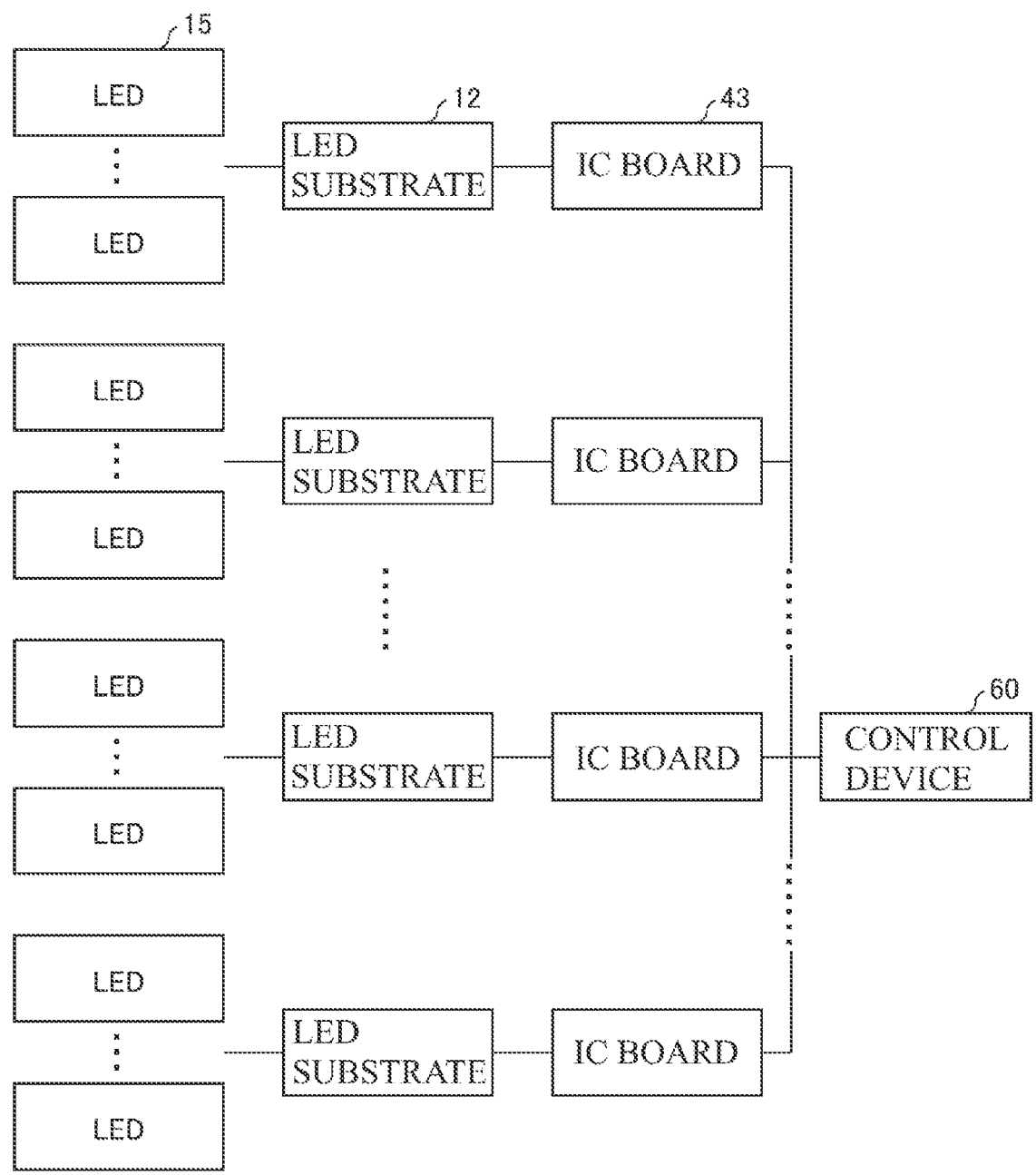
FIG. 18 is a block diagram illustrating a control system of an illumination device, such as in FIG. 3.

As shown in FIG. 18, the plurality of IC boards 43 provided on the base 30 are connected to a control device 60, and drive the LED substrate 12 of the corresponding light guide plate unit 10 under the control of the control device 60. When the LED 15 is turned off, the light guide plate 11A becomes a transmission state, and the sheet 16 positioned on the back side of the light guide plate 11A becomes visible. Although FIGS. 1 and 2 show a state in which all the light guide plate units 10 of the illumination device 1 are turned off, the plurality of light guide plate units may be individually turned on and off.

In the gaming machine 100 shown in FIG. 1, the players' attention may be attracted to the gaming machine 100 by lighting the side surface. Similarly, in the gaming machine group shown in FIG. 2, it may be possible to attract the players' attention by lighting the blind plate and attract the players to the gaming machine group. Due to high presentation and visibility, an attractive housing or housing space may be constructed.

In the configuration shown in FIGS. 1 and 2, it is possible to display only a desired portion of the sheet 16 in the light guide plate unit 10 at a desired timing. In FIG. 1 and FIG. 2, the regular hexagons in the peripheral edge portions of the light guide plate units 10 are emphasized to emphasize the effect obtained by the illumination of light guide plate units at the time of lighting. On the other hand, when the light is turned off, the regular hexagons of the peripheral edge portions of the light guide plate units 10 are thinly drawn to emphasize the sheets 16. However, the appearance of the peripheral edge portions of the light guide plate units 10 is actually the same.

With the above-described configuration, a more impactful presentation may be given by combining the illumination and the sheets 16 that are positioned on the back surfaces of the light guide units 11A.

2. Configuration Example

An illumination device having, on three sides, illumination surfaces for irradiating light will be described.
(1) Outline of Illumination Device 1
A schematic configuration of an illumination unit according to one or more embodiments will be described with reference to FIGS. 3 and 4. FIG. 3 is a perspective view showing an appearance of the illumination device 1 according to one or more embodiments. FIG. 4 is a diagram illustrating a perspective view showing the base 30 and the light guide plate units 10 in the illumination device 1 in a separated state, and only two light guide plate units 10 are shown.

As shown in FIGS. 3 and 4, the illumination device 1 includes the base 30 and the plurality of light guide plate units 10 attached to the base 30. The light guide plate units 10 include flat planar units 10A and bent-shaped corner units 10B. In the case where it is not particularly necessary to distinguish the flat planar unit 10A and the corner unit 10B from each other, these units are collectively referred to as the light guide plate units 10.

The illumination device 1 includes a first illumination surface 1A at the center, a second illumination surface 1B on the left side of the first illumination surface 1A, and a third illumination surface 1C on the right side of the first illumination surface 1A. The second illumination surface 1B extends rearward at, for example, 90 degrees with respect to the first illumination surface 1A. The third illumination surface 1C extends obliquely rearward at, for example, 135 degrees with respect to the first illumination surface 1A.

The shape of the illumination device 1 is determined by the base 30. That is to say, the base 30 is designed to have a desired shape as the illumination device 1. In one or more embodiments, the base 30 includes a first base body 30-1 corresponding to the first illumination surface 1A, a second base body 30-2 corresponding to the second illumination surface 1B, and a third base body 30-3 corresponding to the third illumination surface 1C.

The front surface of the base 30 is an attachment surface for the plurality of light guide plate units 10. The attachment surface is divided into sections for attaching the plurality of light guide plate units 10 so as to lay the light guide plate units 10 over the attachment surface, and each section matches the outer shape of the corresponding light guide plate unit 10. The plurality of light guide plate units 10 are attached to the respective sections with the light emission surfaces facing the front.

The planar units 10A are attached so as to be laid over the sections of the flat portion of the base 30. In order to attach the planar units 10A in the above-described manner, the outer shape of each planar unit 10A is preferably a regular polygon having an internal angle by which 360 degrees are divisible, such as an equilateral triangle, a square, or a regular hexagon. In one or more embodiments, the planar units 10A are formed in regular hexagonal shapes.

Figure 7:
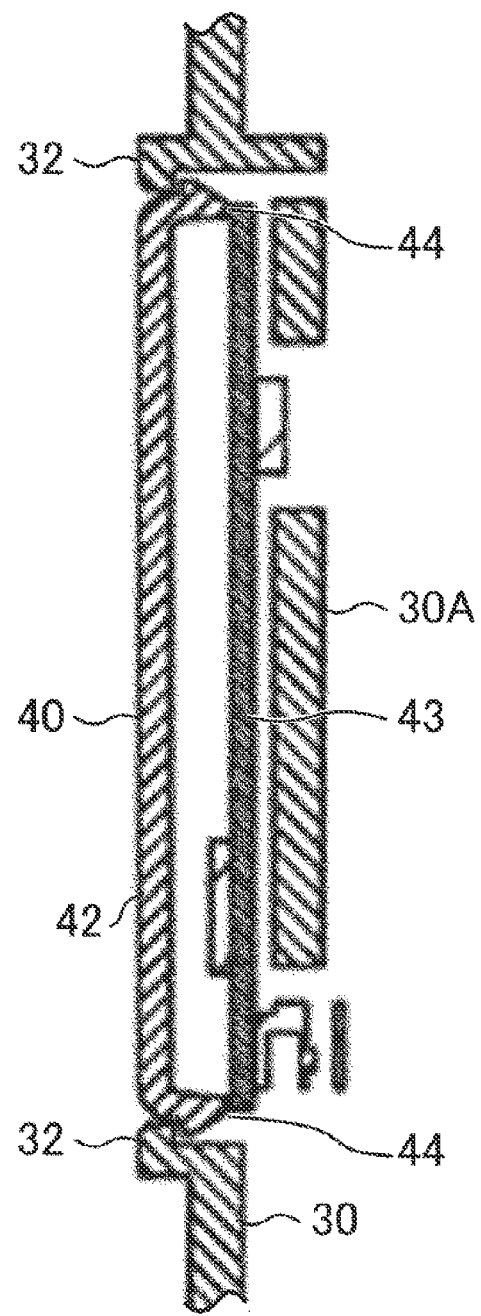
FIG. 7 is a diagram illustrating a cross-sectional view taken along line D of FIG. 5.
Figure 8:
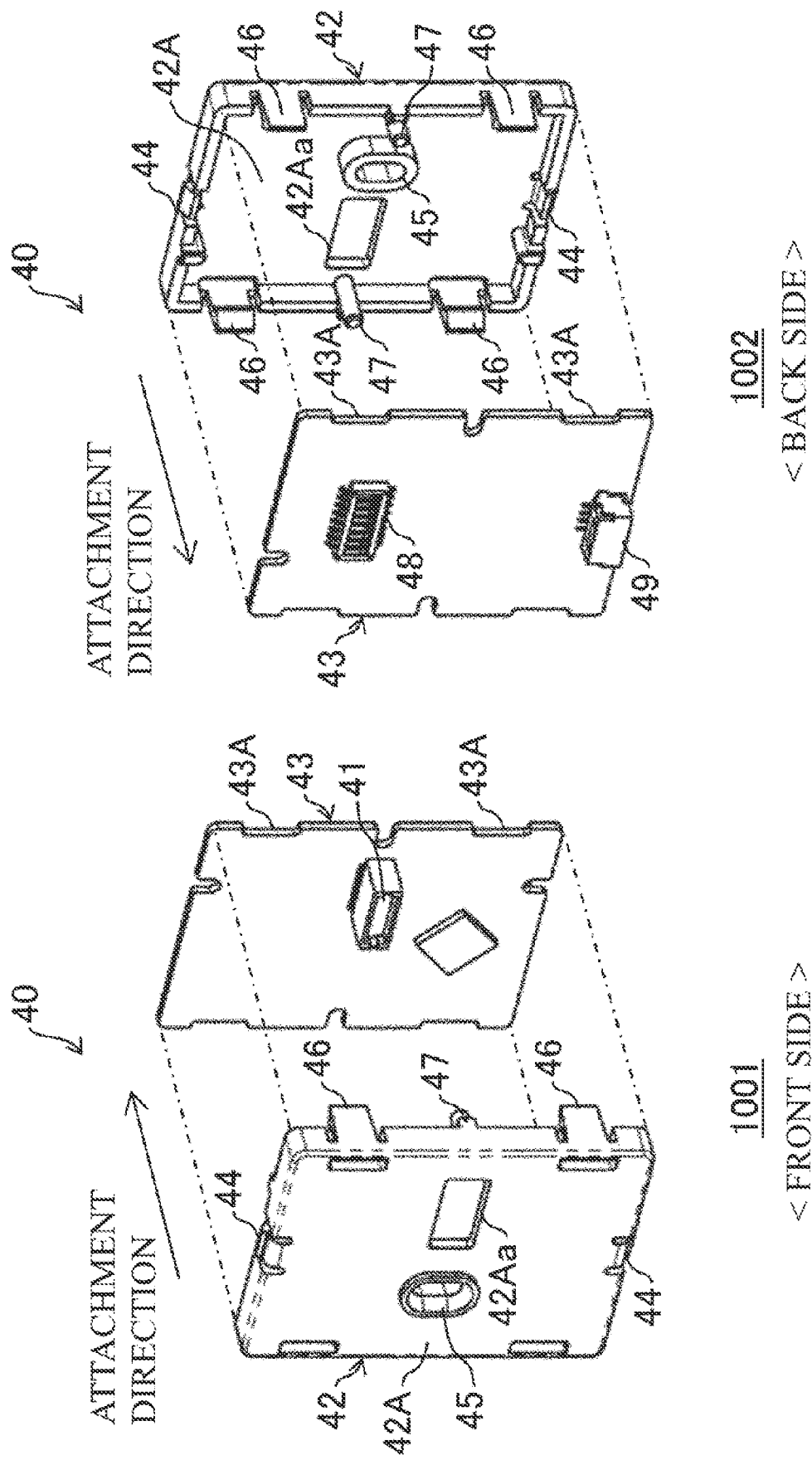
FIG. 8 is a diagram illustrating an exploded view of a connector unit in an illumination device, such as is shown in FIG. 3.
Figure 9:
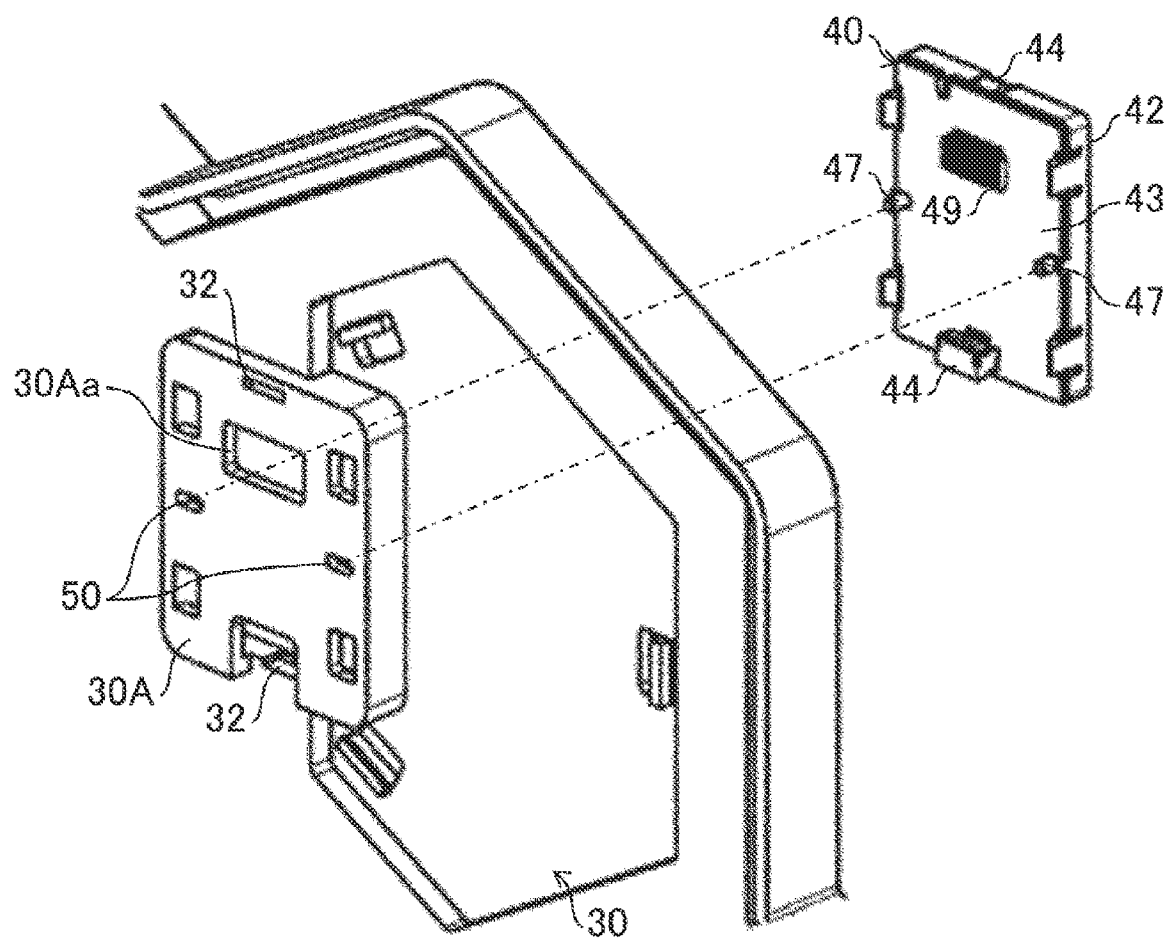
FIG. 9 is a diagram illustrating an explanatory view showing attachment of a connector unit to a base in an illumination device, such as in FIG. 3.
Figure 10:
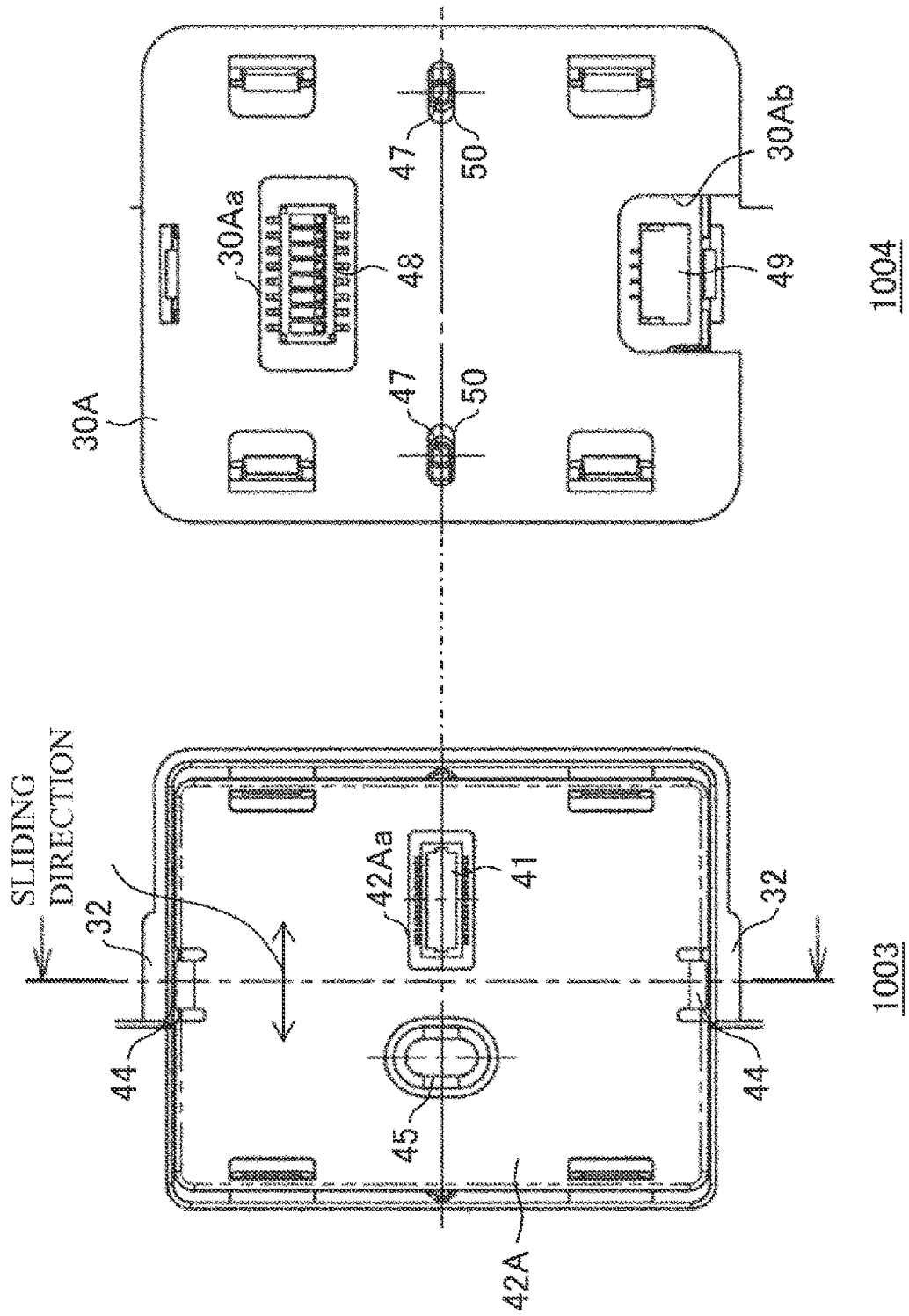
FIG. 10 is a diagram illustrating an explanatory view showing movement of a connector unit attached to a base in an illumination device, such as in FIG. 3.

The corner units 10B are attached to corner portions between the first base body 30-1 and the second base body 30-2, and corner portions between the first base body 30-1 and the third base body 30-3. Each corner unit 10B has a shape formed by bending the planar unit 10A at the same angle as the corner portion. In one or more embodiments, there may be two types of corner units 10B, one having an angle of 90 degrees, and the other having an angle of 135 degrees.
(2) Base 30
FIG. 5 is a diagram illustrating an exploded view of the main part of the illumination device 1, as viewed from the front side of the base 30. FIG. 6 is a diagram illustrating an exploded view of the main part of the illumination device 1, as viewed from the back side of the base 30. FIG. 7 is a diagram illustrating a cross-sectional view taken along line D of FIG. 5. FIG. 8 is a diagram illustrating an exploded view of the connector unit 40, in which reference numeral 1001 denotes a case where the connector unit 40 is viewed from the front side, and reference numeral 1002 denotes a case where the connector unit 40 is viewed from the back side. FIG. 9 is a diagram illustrating an explanatory view showing attachment of the connector unit 40 to the base 30. FIG. 10 is a diagram illustrating an explanatory view showing the movement of the connector unit 40 attached to the base 30, and reference numeral 1003 denotes a case viewed from the front side of the base 30, and reference numeral 1004 denotes a case viewed from the back side of the base 30.

As shown in FIG. 5, each section of the base 30 is provided with snap-fit engagement portions (fixing portions) 31 for attaching the light guide plate unit 10 to the base 30. The snap-fit engagement portions 31 are engaged with snap-fit portions 23 provided in the light guide plate unit 10 to fix the light guide plate unit 10 to the base 30.

Further, a connector unit 40 accommodating an IC board (circuit board) 43 shown in FIG. 8 is attached to each section of the attachment surface of the base 30. In each section, the connector unit 40 is attached to the same position (see FIG. 4).

First, the connector unit 40 will be described with reference to FIG. 8. The connector unit 40 includes a connector case (support) 42 and an IC board 43. The IC board 43 is held inside the connector case 42. The connector case 42 has a shallow box shape with one side open. The IC board 43 has a plurality of notches 43A in the peripheral edge portion. The IC board 43 is fixed by fitting the plurality of snap-fit portions 46 provided on the connector case 42 into the plurality of notches 43A.

An opening 42Aa for exposing an IC-side connector (a connector of the circuit board) 41 formed on the IC board 43 is formed on a surface 42A of the connector case 42 on the side opposite to the open side. Snap-fit portions 44 for fixing the connector unit 40 to the base 30 are provided at central portions of an upper end and a lower end of the connector unit 40. As shown in FIG. 7, the connector unit 40 is fixed to the base 30 by the snap-fit portions 44 being engaged with snap-fit engagement portions 32 formed in the base 30.

A guide hole 45 into which a guide pin 24 of the light guide plate unit 10 to be described later is to be inserted is formed in the surface 42A of the connector case 42 in the vicinity of the opening 42Aa and at the same height as the opening 42Aa. Here, a direction in which the opening 42Aa and the guide hole 45 are positioned is a sliding direction of the connector case 42, which will be described later, and is the left-right direction in one or more embodiments.

Further, a pair of guide shafts 47 are provided on left and right side portions of the connector case 42 at the same height as the opening 42Aa and the guide hole 45. The guide hole 45 and the pair of guide shafts 47 protrude in the attachment direction with respect to the base 30. The attachment direction is a normal direction of the surface 42A. Details of the guide hole 45 will be described later.

As shown in FIGS. 6 and 9, recessed portions 30A corresponding to the shape of the connector units 40 are formed in portions of the base 30 to which the connector units 40 are attached. The snap-fit engagement portions 32 for engaging the snap-fit portions 44 of the connector unit 40 are formed at the upper end and the lower end of each recessed portion 30A. Further, openings 30Aa and 30Ab for exposing a DIP switch 48 and an external connector 49 provided on a surface of the IC board 43 opposite to the IC-side connector 41 are formed in the recessed portion 30A.

As shown in FIG. 10, the vertical dimension of the recessed portion 30A is set to match the vertical dimension of the connector unit 40 so that there is no more margin than is necessary. On the other hand, the dimension of the recessed portion 30A in the left-right direction is set to be larger than the dimension of the connector unit 40 in the left-right direction. With the above-described configuration, the connector unit 40 may slide in the left-right direction while attached to the base 30. In other words, the connector case 42 slidably supports the IC board 43 with respect to the base 30 so as to absorb the positional deviation in the left-right direction between the LED-side connector 21 and the IC-side connector 41 of the light guide plate unit 10 as will be described in greater detail hereinafter.

A pair of elongated holes 50 elongated in the left-right direction are formed in the recessed portion 30A at positions corresponding to the guide shafts 47 of the connector unit 40. As shown in FIGS. 9 and 10, the pair of guide shafts 47 are inserted into the pair of elongated holes 50. These are provided to restrict the sliding of the connector unit 40, and the guide shafts 47 and the elongated holes 50 constitute a slide restricting portion. The sliding amount of the connector unit 40 is restricted within a range in which the guide shafts 47 move in the elongated holes 50, and the moving direction of the connector unit 40 is also restricted in the left-right direction (sliding direction), which is the longitudinal direction of the elongated holes 50.

(3) Planar Unit 10A

Figure 12:
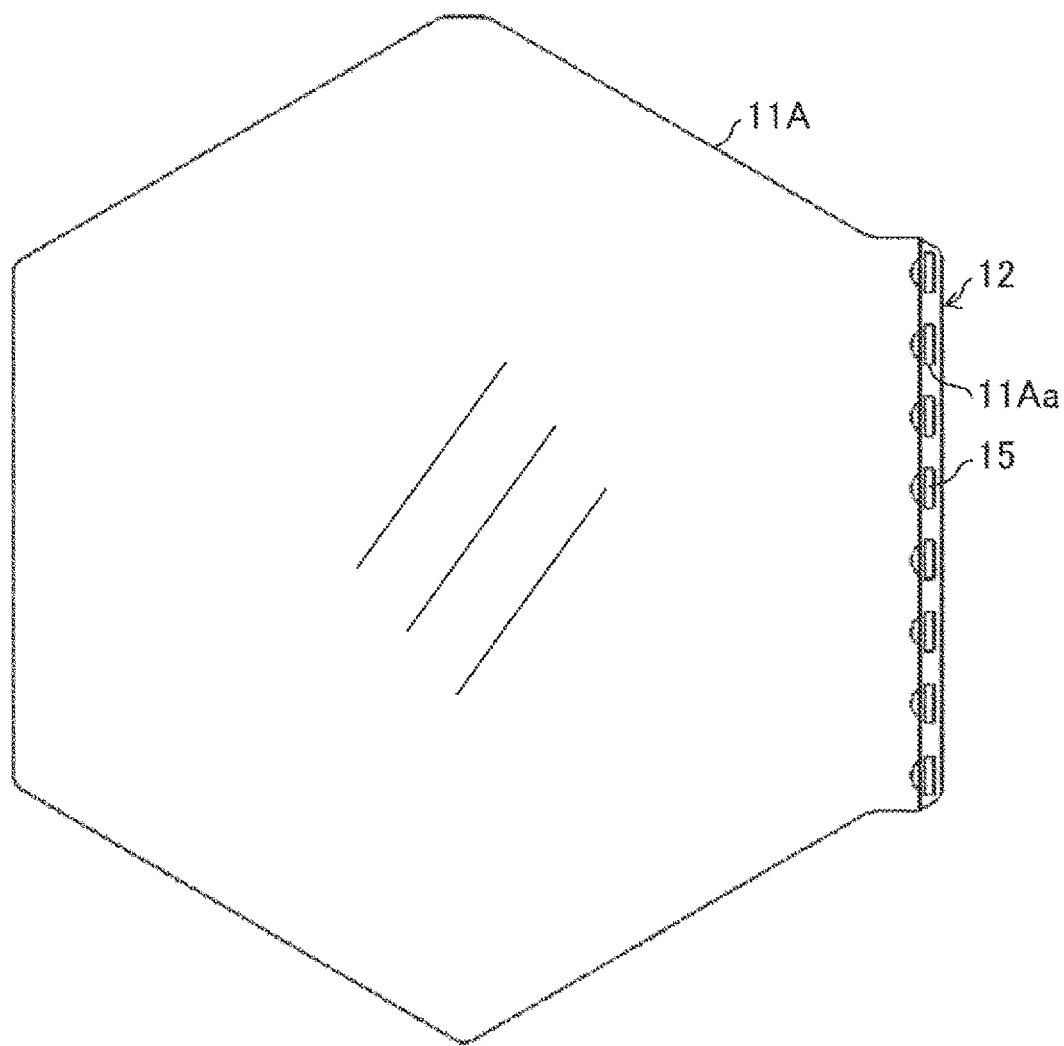
FIG. 12 is a diagram illustrating a light guide plate and an LED substrate in a planar unit, such as in FIG. 11.

FIG. 11 is a diagram illustrating an exploded view of the planar unit 10A. FIG. 12 is a diagram illustrating the light guide plate 11A and the LED substrate 12 in the planar unit 10A. FIG. 13 is a diagram illustrating a rear view of the planar unit 10A.

As shown in FIG. 11, the planar unit 10A includes the light guide plate 11A, the LED substrate 12, the sheet 16, the cover 13A, and the case 14A. The light guide plate 11A, the sheet 16, the cover 13A, and the case 14A are each formed in a regular hexagonal shape. The LED substrate 12 is an example of a light source unit, and includes a plurality of full-color LEDs 15. The LED substrate 12 is positioned inside the case 14A.

As shown in FIG. 12, the plurality of LEDs 15 are positioned on an end surface of one side of six sides of the light guide plate 11A, and LED light emitted from the plurality of LEDs 15 enters the light guide plate 11A from the end surface. In one or more embodiments, the one side of the light guide plate 11A on which the plurality LEDs 15 are positioned are formed to be longer toward the outside, and recesses 11Aa corresponding to the plurality of LEDs 15 are formed in the end surface.

The light guide plate 11A is a plate-shaped member about 2 mm thick made of transparent polycarbonate or acrylic resin. On the back surface of the light guide plate 11A, a design or a pattern is drawn using unevenness. Hereinafter, the unevenness is referred to as prisms. When the plurality of LEDs 15 are lit, LED light enters the inside of the light guide plate 11A, and proceeds while repeating regular reflection between the light emission surface on the front side and the rear surface having the prisms. The LED light starts from the end surface on which the plurality of LEDs 15 are positioned and spreads toward the remaining five end surfaces. In the meantime, the LED light incident on the prisms on the back side is reflected by the prisms and emitted, and the design and pattern drawn by the prisms emerges. The entire light guide plate 11A may be used as an illumination surface of the color of the LED light, by providing the prisms on the entire back surface like a mosaic.

The sheet 16 is visible, includes a pattern or a design printed thereon, and is positioned on the back surface side of the light guide plate 11A. The sheet 16 is not limited to including a pattern or a design printed thereon, and may be black or white. Such a sheet 16 becomes visible when the light guide plate 11A is turned off.

The light guide plate 11A is accommodated inside the cover 13A and the case 14A together with the LED substrate 12 and the sheet 16. Such a planar unit 10A is unitized, and may be handled as one component.

The cover 13A protects the light guide plate 11A, and a region excluding a bezel 13A-1 in the peripheral edge portion is formed to be transparent. The outside of the bezel 13A-1 may also be formed in a mirror state by applying a reflection film or the like. By forming the outside of the bezel 13A-1 in a mirror state, when the illumination device 1 is turned on, the light of the light guide plate unit 10 positioned in itself or in the vicinity thereof is reflected, and more brilliant illumination is possible.

Further, in one or more embodiments, a reflection film 17 is provided on a surface of the inner side of the bezel 13A-1 with which the end surface of the light guide plate 11A abuts. The reflection film 17 may be formed by depositing a reflective material such as aluminum by a manufacturing method such as plating or vapor deposition. By providing such a reflection film 17 on the surface against which the end surface of the light guide plate 11A abuts, the LED light reaching the end portion of the light guide plate 11A may be turned back to the inside of the light guide plate 11A, and brighter irradiation may be performed by effectively using the LED light.

As shown in FIG. 13, the case 14A is provided with snap-fit portions 23 for attaching the planar unit 10A to the base 30. The snap-fit portions 23 protrude to the back side, and are engaged with the respective snap-fit engagement portions 31 provided on the base 30. An opening 14Aa for exposing the LED-side connector 21 of the LED substrate 12 is formed in the case 14A.

Further, a guide pin 24 to be inserted into the above-mentioned guide hole 45 formed in the connector unit 40 is formed in the vicinity of the opening 14Aa and at the same height as the opening 14Aa. Here, the direction in which the opening 14Aa and the guide pin 24 are positioned is the sliding direction of the connector unit 40 described above, and is the left-right direction in one or more embodiments. The guide pin 24 protrudes in the direction of attachment to the connector unit 40. The attachment direction is the normal direction of the back surface of the case 14A. Details of the guide pin 24 will be described later.

(4) Corner Unit 10B

The corner unit 10B has the same configuration as that of the planar unit 10A, except that the angle of the corner unit 10B corresponds to the angle of the corner portion of the base 30. That is to say, although not shown, a cover and a case are formed in a shape in which the cover 13A and the case 14A are bent along a line that passes through two vertices and the center of the regular hexagon, and is parallel to the end surface in which the recesses 11Aa are formed.

Figure 14:
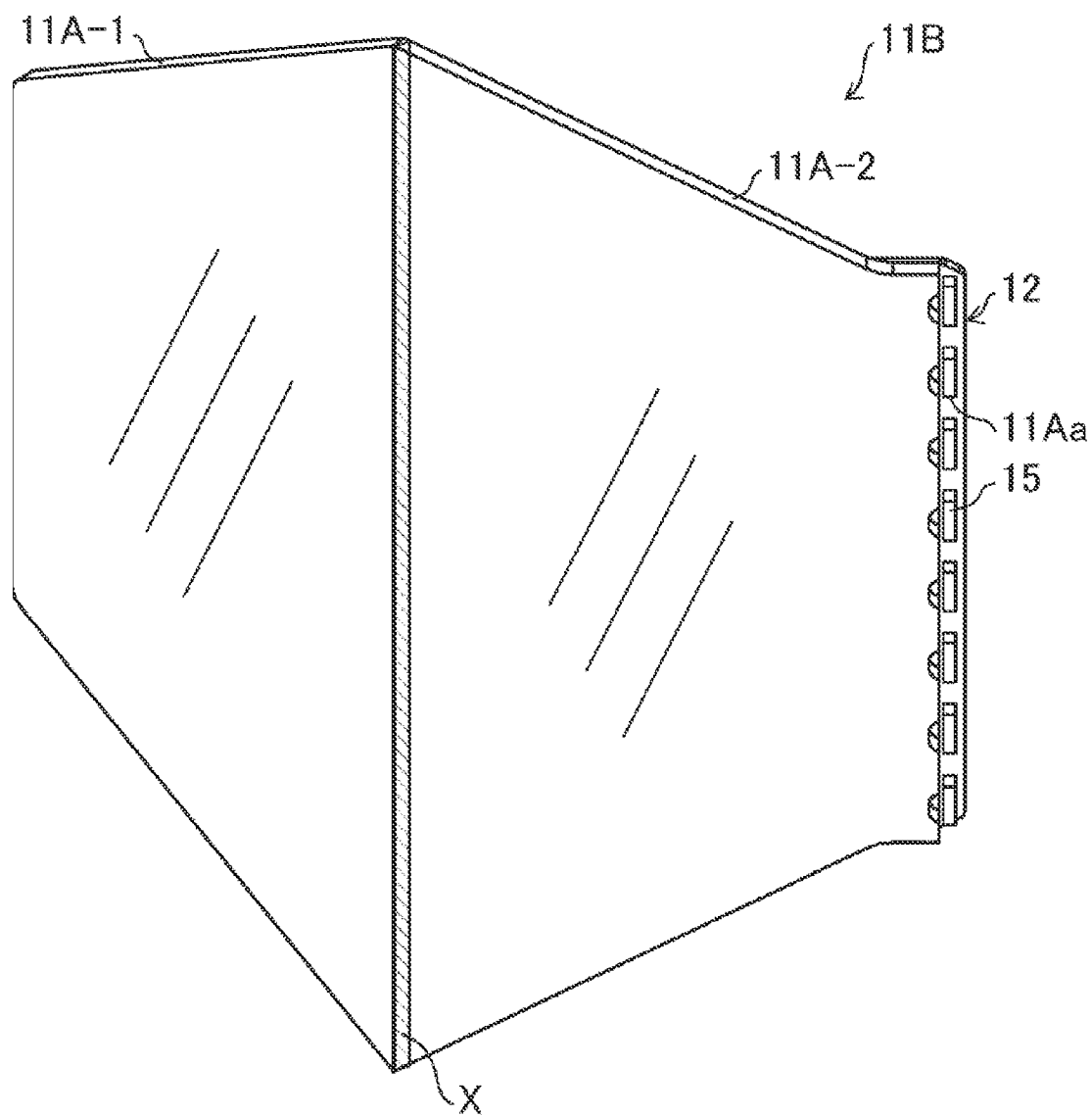
FIG. 14 is a diagram illustrating a light guide plate and an LED substrate of a corner unit in an illumination device, such as in FIG. 3.

However, the light guide plate may not be bent. Accordingly, as shown in FIG. 14, a light guide plate 11B has a configuration in which two trapezoidal light guide plates (halved light guide plates) 11A-1 and 11A-2 are butted against each other at end portions thereof at a predetermined angle. The predetermined angle corresponds to the angle of the corner portion of the base 30. FIG. 14 is a diagram illustrating the light guide plate 11B and the LED substrate 12 in the corner unit 10B.

Each of the light guide plates 11A-1 and 11A-2 has a shape obtained by cutting the light guide plate 11A shown in FIG. 12 along a line that passes through the two vertices and the center of the regular hexagon and is parallel to the end surface in which the recesses 11Aa are formed.

An inclined surface X with a reflection function is formed at one of the end portions where the light guide plates 11A-1 and 11A-2 are butted against each other. The inclined surface X with a reflection function has a function of changing the angle of light to be guided, and subjects the light to regular reflection. The inclined surface X with a reflection function changes the traveling direction of the LED light traveling in the light guide plate 11A-2 to a direction toward the light guide plate 11A-1.

When the angle of the corner portion of the base 30 is 90 degrees, for example, the light guide plates 11A-1 and 11A-2 are butted against each other at the angle of 90 degrees. Accordingly, it is necessary to change the traveling direction of the LED light traveling in the light guide plate 11A-2 by 90 degrees. Thus, the inclined surface X with a reflection function is formed by inclining the end surface of the light guide plate 11A-1 or 11A-2 by 45 degrees and depositing a reflection film 17 on the inclined surface.

Figure 15:
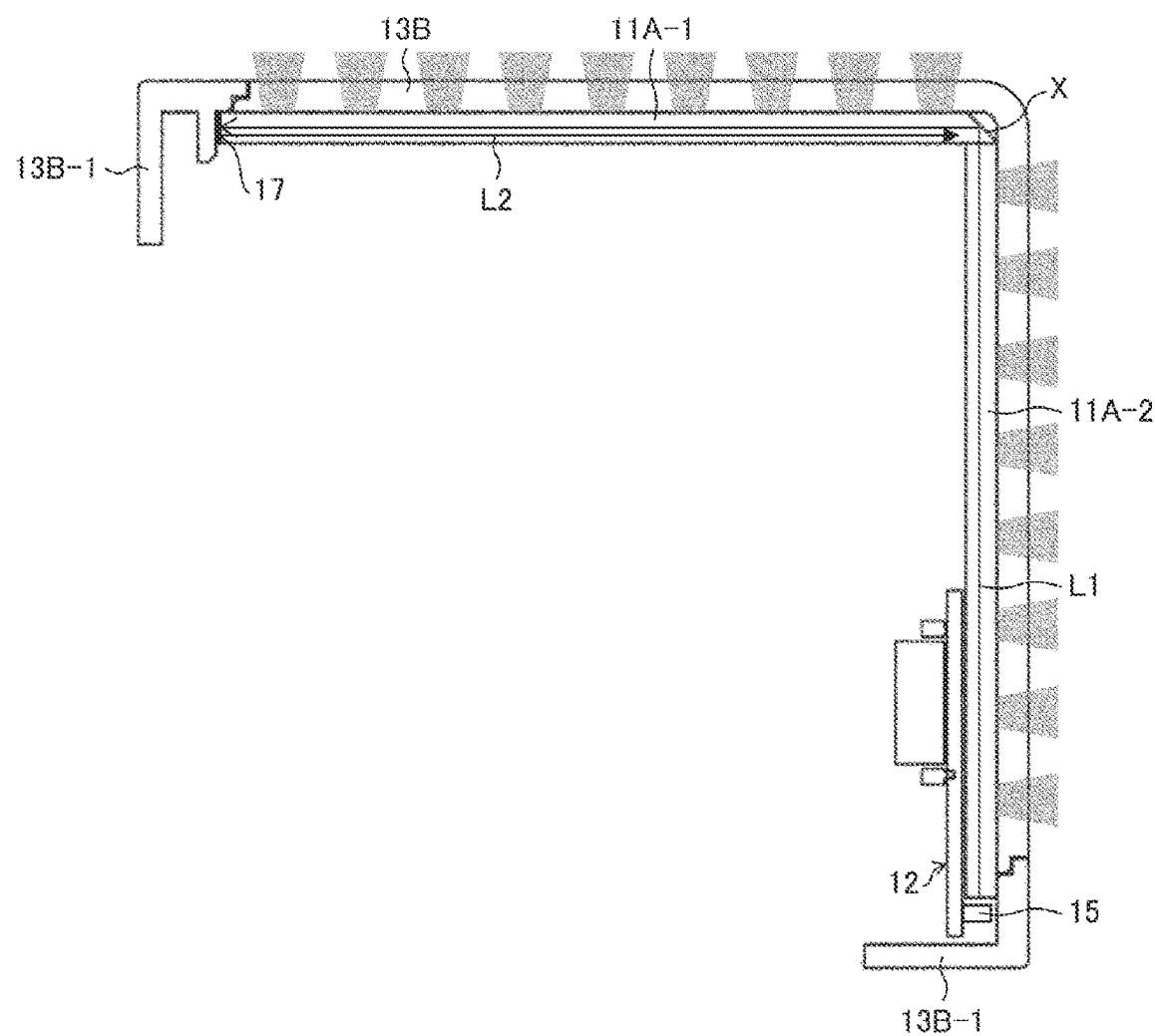
FIG. 15 is a diagram illustrating a main part of a corner unit, such as in FIG. 14.

(5) Light Guiding and Inclined Surface X with Reflection Function in Corner Unit 10B FIG. 15 is a diagram illustrating a main part of the corner unit 10B. In FIG. 15, only the light guide plate 11B, the cover 13B, and the LED substrate 12 are shown. As shown in FIG. 15, the inclined surface X with a reflection function is formed at one of the end portions where the light guide plates 11A-1 and 11A-2 are butted against each other. In the configuration of FIG. 15, the end surface of the light guide plate 11A-1 is an inclined surface inclined at 45 degrees from the light emission surface toward the back surface. The reflection film 17 is provided on the inclined surface to form the inclined surface X with a reflection function.

By setting the angle of the inclined surface to 45 degrees, the traveling direction of the LED light incident from the light guide plate 11A-2 on which the LED substrate 12 is positioned may be changed by 90 degrees. Further, by providing the reflection film 17 on the inclined surface, attenuation of light may be effectively suppressed. The end surface of the light guide plate 11A-2 may also be an inclined surface inclined at 45 degrees from the light emission surface toward the back surface.

An arrow L1 indicates a light guide path of the LED light emitted from the plurality of LEDs 15. The LED light enters from the end surface of the light guide plate 11A-2, travels inside the light guide plate 11A-2, and enters the light guide plate 11A-1 from the back surface of the light guide plate 11A-1 from the end portion of the light guide plate 11A-2 that is butted against the light guide plate 11A-1. Then, the traveling direction of the LED light is changed by 90 degrees by the inclined surface X with a reflection function, and the LED light travels inside the light guide plate 11A-1. The light reaching the end surface of the light guide plate 11A-1 in the traveling direction is reflected by the reflection film 17 formed on the inner surface of the bezel 13B-1 of the cover 13B, and is returned to the inside of the light guide plate 11A-1. An arrow L2 indicates a light guide path of the reflection light reflected and returned by the reflection film 17.

Because the light guiding in the planar unit 10A is the same as that in the case where the LED light reflected by the inclined surface X with a reflection function in the corner unit 10B travels inside the light guide plate 11A-1 and is reflected by the reflection film 17 to be returned, the description thereof will be omitted.

(6) Attachment/Detachment Structure of Light Guide Plate Unit 10

Figure 16:
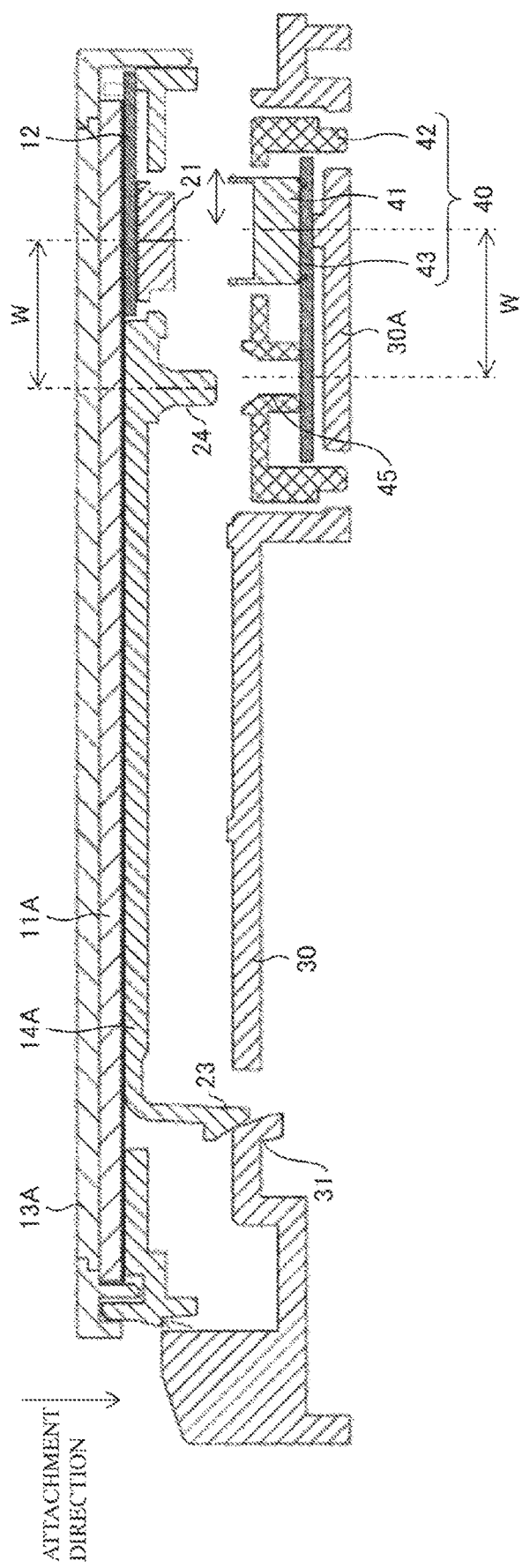
FIG. 16 is a diagram illustrating a cross-sectional view of one section of an illumination device, such as in FIG. 3, showing a state immediately before a light guide plate unit is attached to a base.
Figure 17:
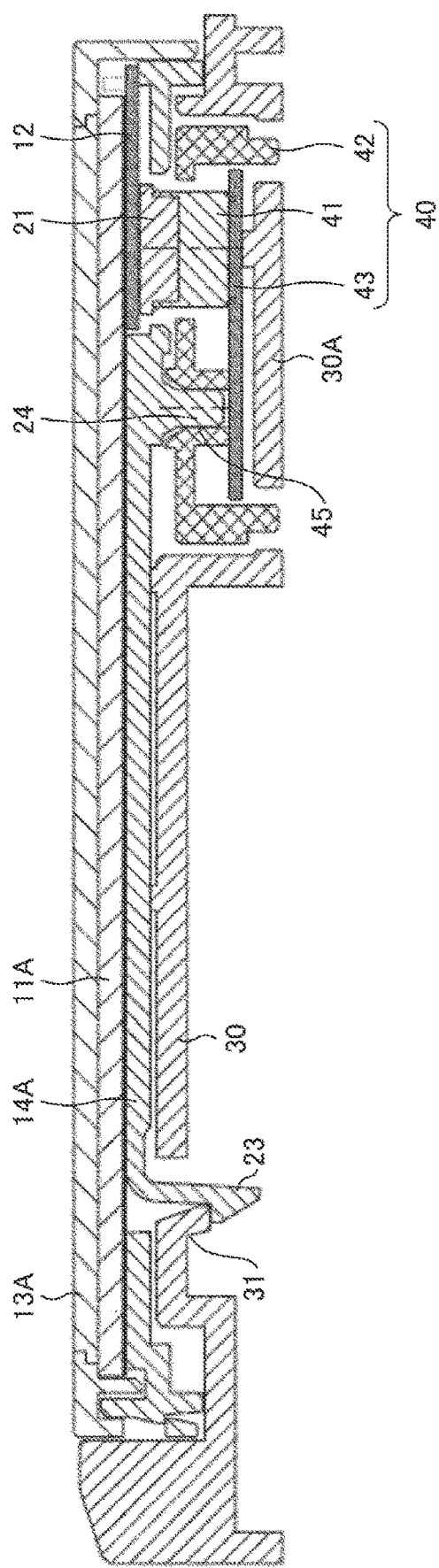
FIG. 17 is a diagram illustrating a cross-sectional view of one section of an illumination device, such as in FIG. 3, showing a state in which a light guide plate unit is attached to a base.

Next, referring to FIGS. 5, 10, 13, 16, and 17, description will be given of an attachment/detachment structure that enables attachment/detachment of the light guide plate unit 10 to/from the base 30. Although the planar unit 10A is exemplified in the description, the same applies to the corner unit 10B. FIGS. 16 and 17 are cross-sectional views of one section of the illumination device 1, FIG. 16 shows a state immediately before the light guide plate unit 10 is attached to the base 30, and FIG. 17 shows a state after the light guide plate unit 10 is attached to the base 30.

As shown in FIG. 13, the snap-fit portions 23 for attaching the planar unit 10A to the base 30 are provided on the back surface of the planar unit 10A, and the LED-side connector (connector of the light emitting portion) 21 is exposed from the opening 14Aa. Further, the guide pin 24 is formed at the same height position as the opening 14Aa.

The guide pin 24 is positioned on a straight line passing through the opening 14Aa. As shown in FIG. 16, the guide pin 24 protrudes from the LED-side connector 21 in the attachment direction. The distance between the center of the guide pin 24 and the center of the LED-side connector 21 in the longitudinal direction is set to W.

On the other hand, as shown in FIG. 5, the snap-fit engagement portions 31 for engaging the snap-fit portions 23 of the planar unit 10A are formed on the attachment surface of the base 30, and the connector unit 40 is attached to the attachment surface of the base 30. As shown in FIG. 10, in the connector unit 40, the IC-side connector 41 that is electrically connected to the LED-side connector 21 is exposed from the opening 42Aa.

Further, the guide hole 45 into which the guide pin 24 of the planar unit 10A is inserted is formed at the same height position as the opening 42Aa. The guide hole 45 is positioned on a straight line in the sliding direction passing through the opening 42Aa. As shown in FIG. 16, the distance between the center of the guide hole 45 and the center of the IC-side connector 41 in the longitudinal direction is set to W, which is the same as the distance between the center of the guide pin 24 and the center of the LED-side connector 21 in the longitudinal direction.

Further, in one or embodiments, the guide hole 45 is formed such that the inlet side into which the guide pin 24 is inserted is wider than the back side, and a taper for guiding the distal end portion of the guide pin 24 is provided on the inlet side. Further, the guide hole 45 is formed long in the vertical direction orthogonal to the sliding direction.

When the planar unit 10A is attached, as shown in FIG. 16, the planar unit 10A is opposed to the base 30 so that the LED-side connector 21 of the planar unit 10A and the IC-side connector 41 of the base 30 are opposed to each other. In the above-described state, the snap-fit portions 23 of the planar unit 10A and the snap-fit engagement portions 31 of the base 30 are also opposed to each other. Similarly, the guide pin 24 of the planar unit 10A and the guide hole 45 on the base 30 side are opposed to each other.

Next, from the above-described state, the planar unit 10A is pushed toward the base 30. The guide pin 24 protrudes from the LED-side connector 21 in the attachment direction. Accordingly, before the LED-side connector 21 and the IC-side connector 41 of the base 30 are fitted to each other, the distal end portion of the guide pin 24 is inserted into the guide hole 45 of the base 30. Here, as shown in FIG. 16, even if the distal end portion of the guide pin 24 is inserted in a state of being shifted in the left-right direction with respect to the center of the guide hole 45, the connector unit 40 slides with respect to the base 30 and receives the guide pin 24. With the above-described configuration, even if the positional relationship between the LED-side connector 21 and the IC-side connector 41 is slightly shifted due to a tolerance or the like, the shift may be corrected.

Further, in one or more embodiments, because the guide hole 45 is formed long in the vertical direction, the guide pin 24 may be received even when the distal end portion of the guide pin 24 is inserted in a state of being shifted in the vertical direction with respect to the center of the guide hole 45. In addition, the tapered shape provided at the inlet of the guide hole 45 further facilitates insertion of the distal end portion of the guide pin 24. The guide pin 24 may also be provided in the connector case 42, and the guide hole 45 may also be provided in the case 14 of the light guide plate unit 10.

(7) Control System of Illumination Device 1

FIG. 18 is a block diagram illustrating a control system of the illumination device 1. As shown in FIG. 18, the illumination device 1 includes a plurality of IC boards 43 corresponding to the sections of the base 30, and LED substrates 12 connected to the IC boards on a one-to-one basis. The plurality of LEDs 15 are mounted on each LED substrate 12. The plurality of IC boards 43 are connected to one control device 60. Each of the IC boards 43 drives the corresponding LED substrate 12 in accordance with a control signal from the control device 60, and controls the light emission timing, color, brightness, and the like of the plurality of LEDs 15 mounted on the LED substrate 12.

(8) Presentation of Illumination Device 1

In the illumination device 1, when LEDs 15 are turned on, light is emitted from the light guide plates 11A and 11B, and each light guide plate unit 10 enters an illumination state. In the case where the above-mentioned prisms are formed as a whole, the back sides of the light guide plates 11A and 11B are not visible in the above-described illumination state.

When some of the LEDs 15 are turned off, the amount of light emitted from the illumination surface is reduced, the back sides of the light guide plates 11A and 11B are seen through, and a completely visible transmission state is obtained by turning off all the LEDs 15. Although FIGS. 1 and 2 show a state in which all the light guide plate units 10 of the illumination device 1 are turned off, the light guide plate units 10 may be individually turned on and off.

By controlling the color, brightness, timing of light emission, and the like of the plurality of LEDs 15, one light guide plate unit 10 may produce effects with various motions. The control device 60 comprehensively controls and drives the light guide plates 10 via the respective IC boards 43, thereby enabling the plurality of light guide plate units 10 to produce various effects with light.

Further, by turning off the LEDs 15 to make the light guide plates 11A and 11B transparent, a presentation using the sheets 16 positioned on the back side of the illumination device 1 is made possible. As a result, a more impactful presentation combining illumination with the patterns and colors of the sheets 16 positioned on the back side of the light guide plates 11A and 11B may be exhibited.

(9) Effects

The above configuration has the following effects.

The illumination device 1 may be easily assembled by installing the base 30 and attaching the light guide plate units 10 to the base 30. In addition, because the light guide plate units 10 are attached by snap-fitting, the light guide plate units 10 may be easily removed by releasing the engagement from the back side of the base 30. Because disassembly and assembly may be easily performed, movement and installation of the illumination device may be easily performed. In addition, even when a defect occurs in the light guide plate 10, it is possible to replace only the light guide plate 10 having the defect, and therefore maintainability is excellent.

Further, by providing not only the planar units 10A but also the corner units 10B, it is possible to handle not only a planar shape but also a three-dimensional shape.

Also, because the sheet 16 is positioned on the back side of the light guide plates 11A and 11B, a presentation combining illumination using the plurality of light guide plate units 10 and patterns and colors of the sheets 16 may be exhibited. The sheets 16 are not limited to sheets on which patterns are printed and by using black sheets as the sheets 16, there is an effect of showing the illuminating surface at the time of illumination. In addition, when the light is turned off, the illuminating surfaces change to black, and therefore an impactful presentation may be given. Alternatively, white sheets may also be used as the sheets 16 resulting in an effect of making the illuminating surface brighter at the time of illumination. When the light is turned off, the illuminating surfaces change to white, and therefore an impactful presentation may be provided.

3. Modified Example

While one or more embodiments have been described in detail, the forgoing description is merely illustrative in all respects. It will be apparent that various modifications and variations may be made without departing from the scope of the invention. The following modifications are possible, for example. In the following description, the same components as those of the above embodiment are denoted by the same reference numerals, and description of the same points as those of the above embodiment is omitted as appropriate. The following modified examples may be combined as appropriate.

In the above described embodiment or embodiments, each light guide plate unit 10 has a regular hexagonal shape, but may also have a square shape or an equilateral triangular shape as indicated by 1005 to 1007 in FIG. 19. In addition, although it is undeniable that the gaps between the light guide plate units are larger than those in the case where the light guide plate units have a regular hexagonal shape, a square, or an equilateral shape, the light guide plate units may also have a circular shape as indicated by 1008 in FIG. 19 or an elliptical shape. Further, the light guide plate units may also be formed in a rectangular shape as indicated by 1009 in FIG. 19, and may also be alternately positioned in a staggered manner like bricks.

Further, the processing of the end portions serving as the outer peripheral edge of the illumination device 1 may also be performed along the shape of the light guide plate unit 10 as in Embodiment 1, or a light guide plate unit having a half shape of the light guide plate unit 10 may also be separately prepared for the processing of the end portions.

In the attachment surface of the base 30, a flat portion may also partially bulge to form a corner portion, and the corner unit 10B may also be attached to the corner portion to form an accent. Alternatively, a mirror-like dummy member having the same shape as the light guide plate unit 10 may also be formed and attached as an accent, instead of the light guide plate unit 10. Further, the design of the light guide plates 11A and 11B may also be changed, or a design panel may also be provided at a certain position of the light guide plate unit 10. The light guide plate units 10 may be changed to design panels for advertisement or the like, and advertisement may be performed by using a part of the illumination device 1.

Further, such an illumination device 1 may also be installed not only in a game hall but also in a park or a home garden, may also be installed as a partition wall of a playing field of a game, or may also be installed so as to surround an entrance of a hall. Also, the illumination device 1 may also be used for signage.

The invention is not limited to the embodiments described above, and various modifications are possible within the scope of the claims. Embodiments obtained by combining technical means disclosed in different embodiments as appropriate are also included in the technical scope of the invention.

The invention claimed is:

1. An illumination device, comprising:
a plurality of flat light guide plate units each comprising a light guide plate, a light source unit, a cover covering a light emission surface of the light guide plate, and a case positioned on a back surface side of the light guide plate; and
a base to which the plurality of light guide plate units are attached so as to be laid over an attachment surface of the base, wherein
the attachment surface is divided into sections for attaching the plurality of light guide plate units such that the plurality of light guide plate units are laid over the attachment surface,
each of the sections is provided with a circuit board for driving the light source unit, and a fixing portion for detachably fixing the light guide plate unit to the base, and
each of the light guide plate units further comprises a visible sheet that is positioned between the light guide plate and the case.

2. The illumination device according to claim 1, wherein each of the light guide plate has unevenness formed on the entire back surface so that the light guided therein is emitted from the front surface.

3. The illumination device according to claim 1, wherein each of the light source units is a light source substrate comprising a substrate and a plurality of light source elements mounted on an end portion of the substrate, and
a substrate portion of the light source substrate is positioned between the sheet and the case.

4. The illumination device according to claim 1, wherein each of the light guide plate units and each of the light guide plates in the plurality of light guide plate units have an outer shape of a regular polygon having an internal angle by which 360 degrees are divisible.

5. The illumination device according to claim 1, wherein the attachment surface comprises a corner portion having a predetermined angle,
the illumination device further comprises a bent-shaped light guide plate unit to be attached to the corner portion, and
the bent-shaped light guide plate unit has a shape obtained by bending the flat light guide plate unit at the same angle as the corner portion.

6. The illumination device according to claim 5, wherein the bent-shaped light guide plate unit is formed by butting together end portions of division lines of halved light guide plates obtained by dividing the light guide plate of the flat light guide plate unit into two, and forming an inclined surface with a reflection function at one end portion, the inclined surface with a reflection function being for changing an angle of guided light to cause the light to enter the other end portion.

7. The illumination device according to claim 2, wherein each of the light source units is a light source substrate comprising a substrate and a plurality of light source elements mounted on an end portion of the substrate, and
a substrate portion of the light source substrate is positioned between the sheet and the case.

8. The illumination device according to claim 2, wherein each of the light guide plate units and each of the light guide plates in the plurality of light guide plate units have an outer shape of a regular polygon having an internal angle by which 360 degrees are divisible.

9. The illumination device according to claim 3, wherein each of the light guide plate units and each of the light guide plates in the plurality of light guide plate units have an outer shape of a regular polygon having an internal angle by which 360 degrees are divisible.

10. The illumination device according to claim 2, wherein the attachment surface comprises a corner portion having a predetermined angle,
the illumination device further comprises a bent-shaped light guide plate unit to be attached to the corner portion, and
the bent-shaped light guide plate unit has a shape obtained by bending the flat light guide plate unit at the same angle as the corner portion.

11. The illumination device according to claim 3, wherein
the attachment surface comprises a corner portion having a predetermined angle,
the illumination device further comprises a bent-shaped light guide plate unit to be attached to the corner portion, and
the bent-shaped light guide plate unit has a shape obtained by bending the flat light guide plate unit at the same angle as the corner portion.

12. The illumination device according to claim 4, wherein
the attachment surface comprises a corner portion having a predetermined angle,
the illumination device further comprises a bent-shaped light guide plate unit to be attached to the corner portion, and
the bent-shaped light guide plate unit has a shape obtained by bending the flat light guide plate unit at the same angle as the corner portion.

\* \* \* \* \*